March 19, 1929.   H. C. MALLORY   1,705,622
METHOD OF PRODUCING EXPANSIBLE COLLAPSIBLE ELEMENTS
Filed Aug. 31, 1920
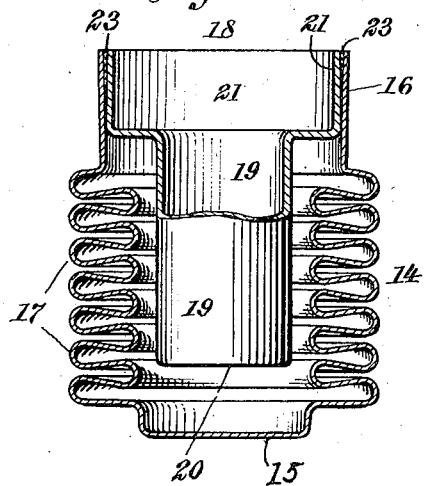
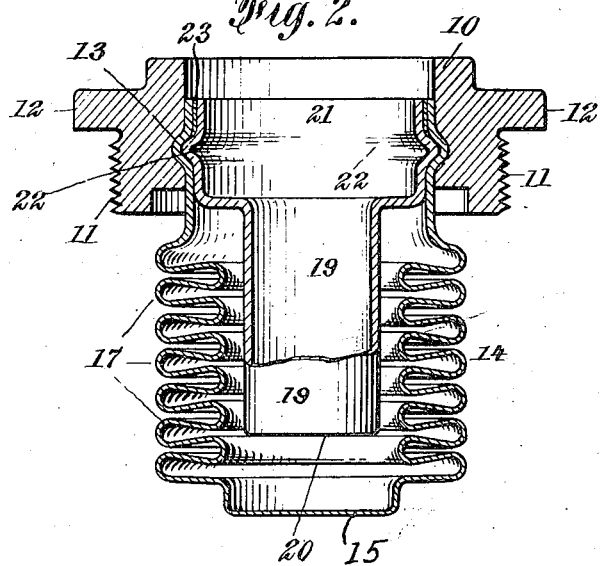
Inventor
Harry C. Mallory
By Conrad A. Dieterich
his Attorney Patented Mar. 19, 1929.

1,705,622

UNITED STATES PATENT OFFICE.

HARRY C. MALLORY, OF BELLPORT, NEW YORK, ASSIGNOR, BY MESNE ASSIGNMENTS, TO AMERICAN RADIATOR COMPANY, OF CHICAGO, ILLINOIS, A CORPORATION OF NEW JERSEY.

METHOD OF PRODUCING EXPANSIBLE-COLLAPSIBLE ELEMENTS.

Application filed August 31, 1920. Serial No. 407,211.

My invention relates to elastic elements, and the same has for its object more particularly to provide an elastic metallic element for use in connection with apparatus or devices subject to or influenced by temperature or pressure variations, whereby to operate a valve, apparatus or other mechanism.

Further, said invention has for its object to provide an expansible-collapsible element of the character specified having means whereby said element may be readily and efficiently secured to or within a support or closure so as to form an hermetically sealed joint where said parts meet.

Further, said invention has for its object to provide an expansible-collapsible element of the character specified having means whereby said element may be readily and conveniently secured to or within a support or closure, and hermetically sealed thereto at a point beyond the point or zone where said element is mechanically secured to said support or closure.

Further, said invention has for its object to provide a simple, convenient and inexpensive method of producing an expansible-collapsible element of the character hereinabove specified.

Other objects will in part be obvious, and in part be pointed out hereinafter.

To the attainment of the aforesaid objects and views my invention consists in the several steps constituting the method hereinafter more fully described, and then pointed out in the claims.

In the accompanying drawings forming part of this specification wherein like numerals of reference indicate like parts, Figure 1 is an enlarged central section showing one form of expansible-collapsible element and closure secured thereto constructed according to, and embodying my said invention, and Fig. 2 is a similar view showing the sealed or closed expansible-collapsible element mechanically secured to a support.

In said drawings 10 designates an annular support provided upon its outer side with screw-threads 11, and above said screw threads with a shoulder 12. Upon the inner side of said annular support 10 is provided circular recess 13.

14 denotes an expansible-collapsible element formed from a cylindrical shell having a closed end 15, an open end 16, and an intermediate or body portion provided with a series of circumferential corrugations or folds 17. The open end portion 16 has its side wall smooth, and of greater thickness than the corrugated intermediate or body portion with which it is united by an annular wall portion which diminishes in thickness from the wall of said open end portion 16 towards the corrugated intermediate portion with which it merges.

18 denotes a closure for said expansible-collapsible element which comprises a cylindrical portion 19 of smaller diameter than the interior of said expansible-collapsible element within which the same is disposed. The inner end of the cylindrical portion 19 is provided with a closed end 20, and its outer end, which is of greater diameter than said cylindrical portion 19, forms a flange 21 which conforms closely to the inner surface of the wall portion of the open end portion 16 of the expansible-collapsible element.

The outer end of the wall portion of the open end 16 of the expansible-collapsible element, and the corresponding end of the flange 21 of the closure 18 are jointly pressed into engagement with the circular recess in the inner side of the support 10, and firmly secured thereto by a bead 22.

To render the joint between the outer ends of the expansible-collapsible element 14 and the closure 18 fluid tight the parts are soldered or otherwise sealed by a suitable sealing medium 23 which may extend from the bead 22, which mechanically joins said parts, outwardly towards the outer edges of the element 14 and closure 18.

It is to be noted that by sealing the parts at a point above or beyond the annular bead 22, the sealed parts may be readily and conveniently secured by pressure within said support 10 without danger or liability of injuring or rupturing the seal.

This application is a continuation in part of my earlier application, filed April 22, 1914, Serial No. 833,593, renewed December 5, 1919, Serial No. 342,802, and patented January 25, 1921, No. 1,366,473.

In this case no claim is made for the product resulting from the process herein described and claimed, as said product constitutes the subject matter of application Ser. No. 46,105, filed July 25, 1925.

Having thus described my said invention, what I claim and desire to secure by Letters Patent is:—

1. The process of making a device of the character described which consists in forming a shell, circumferentially corrugating the intermediate part thereof, disposing an end closure within said shell, hermetically sealing said closure to said shell, inserting one end of said shell into a support having an internal groove therein, pressing a portion of said shell and said closure annularly into the groove in said support at a point below that where said closure is sealed to said shell whereby to maintain said shell in position within said support, substantially as specified.

2. The process of making a device of the character specified which consists in taking an expansible-collapsible element having a thin flange at one end, applying to said flange a closure in extended surface engagement therewith, sealing the assembled parts to secure the same together in intimate contact, to provide a fluid tight joint between the same, and then attaching said element to a support, substantially as specified.

3. The process of making a device of the character specified which consists in taking an expansible-collapsible element having a thin flange at one end, applying to said flange a closure in extended surface engagement therewith, sealing the assembled parts together in intimate contact to form a fluid tight joint between the same, and then attaching said element at said thin flange to a support without unduly impairing the condition of the sealed joint, substantially as specified.

4. The process of sealing an expansible-collapsible element having a flexible wall of thin metal and attaching the same to a support which consists in sealing a closure to said element independently of said attaching operation, and then attaching said device to a support and subjecting said device to pressure, without subjecting the sealed joint to pressure strains, whereby to maintain said expansible-collapsible element and closure duly in position on said support, substantially as specified.

5. The process of making a device of the character specified which consists in taking an expansible-collapsible element having a thin flange at one end, applying to said flange a closure having a flange in extended surface engagement therewith, sealing said parts at said flanges to form a fluid tight joint between the same, and then pressing said flanges laterally into engagement with a support, substantially as specified.

6. The process of sealing an expansible-collapsible element and attaching the same to a support which consists in sealing a portion of a closure to said expansible-collapsible element, forming an annular recess in said support, disposing said expansible-collapsible element with its closure within said support, and then pressing the corresponding portions of said expansible-collapsible element and said closure into the annular recess in said support, substantially as specified.

7. The process of sealing an expansible-collapsible element having an annular flange at one end and attaching the same to a support which consists in taking a closure having an annular flange, disposing said closure within said expansible-collapsible element and hermetically sealing a portion of the flange of said closure to the flange of said expansible-collapsible element, forming an annular recess in said support, inserting the flange portion of said expansible-collapsible element into said support, and then subjecting the flange portions of said expansible-collapsible element and of said closure below their point of securement to each other to pressure and expanding the same into the annular recess in said support whereby to hold said expansible-collapsible element in position in said support, substantially as specified.

8. The process of making a device of the character specified which consists in taking an expansible-collapsible element, applying a closure thereto, and sealing said parts to form a fluid tight joint between the same, and uniting said parts by a separate operation independently of said sealing operation, substantially as specified.

9. The process of making a device of the character specified which consists in taking an expansible-collapsible element, applying a closure thereto, and sealing said parts to form a fluid tight joint between the same, and forming attaching means on said device by a separate operation independently of said sealing operation, substantially as specified.

10. The process of making a device of the character specified which consists in taking an expansible-collapsible element, applying a closure thereto, and sealing said parts to form a fluid tight joint between the same, and by pressure forming attaching means on said device; said sealing and pressing operations being so performed as to insure a permanently sealed joint, substantially as specified.

11. The process of making a device of the character specified which consists in taking an expansible-collapsible element, applying a closure thereto, sealing said parts to form a fluid tight joint between the same, and then forming attaching means thereon, substantially as specified.

12. The process of making a device of the character specified which consists in taking an expansible-collapsible element, applying a closure thereto, sealing said parts to form a fluid tight joint between the same, and then forming attaching means thereon adjacent to said sealed joint without unduly impairing the condition of said sealed joint, substantially as specified.

13. The process of making a device of the character specified which consists in taking an expansible-collapsible element having an annular flange at one end, applying thereto a closure having an annular flange to conform closely to the flange of said element, hermetically sealing portions of the contiguous surfaces of said flanges to form a fluid tight joint between the same, and then subjecting the flange portions of said element and said closure beyond their point of securement to each other to pressure to form means therein whereby to permit of the attachment of said device to a support, substantially as specified.

14. The process of making a device of the character specified which consists in taking an expansible-collapsible element having a thin flange at one end, applying to said flange a closure in extended surface engagement therewith, and sealing the assembled parts in intimate contact to provide a fluid tight joint between the same, and attaching said element to a support by a separate operation independently of said sealing operation, substantially as specified.

15. The process of making a device of the character specified which consists in taking an expansible-collapsible element having a thin flange at one end, applying to said flange a closure having a flange in extended surface engagement therewith, and sealing said flanges to form a fluid tight joint between the same, and pressing said flanges laterally into engagement with a support by a separate operation independently of said sealing operation, substantially as specified.

16. The process of making a device of the character specified which consists in taking an expansible-collapsible element, having a thin flange at one end, applying to said flange a closure having a flange in extended surface engagement therewith, and sealing said flanges to form a fluid tight joint between the same, and pressing said flanges laterally into engagement with a support; said sealing and pressing operations being so performed as to insure a permanently sealed joint, substantially as specified.

17. The process of making a device of the character specified which consists in taking an expansible-collapsible element having an annular flange at one end, applying thereto a closure having an annular flange to conform closely to the flange of said element, hermetically sealing the contiguous surfaces of said flanges to form a fluid tight joint between the same, and then attaching said parts at said flanges to a support without unduly impairing the condition of the sealed joint, substantially as specified.

18. The process of making a device of the character specified which consists in taking an expansible-collapsible element having a thin flange at one end, applying to said flange a closure in extended surface engagement therewith, hermetically sealing the contiguous surfaces of said assembled parts to form a fluid tight joint between the same and to permanently secure the same together, and then attaching said parts at said flange to a support without unduly impairing the condition of said sealed joint, substantially as specified.

19. The process of making a device of the character specified which consists in taking an expansible-collapsible element having an annular flange at one end, applying thereto a closure having an annular flange to conform closely to the flange of said element, hermetically sealing portions of the contiguous surfaces of said flanges to form a fluid tight joint between the same, and then subjecting the flange portions of said element and said closure beyond their point of securement to each other to pressure to force the same into engagement with a support, substantially as specified.

Signed at the city of New York, New York County, in the State of New York, this first day of June, one thousand nine hundred and twenty.

HARRY C. MALLORY.